United States Patent [19]

Nelson

[11] 4,134,612

[45] Jan. 16, 1979

[54] VEHICLE MIRROR CLEANING DEVICE

[75] Inventor: Joseph E. Nelson, Bolingbrook, Ill.

[73] Assignee: John W. Hopping, Bolingbrook, Ill.; a part interest

[21] Appl. No.: 832,437

[22] Filed: Sep. 12, 1977

[51] Int. Cl.² .......................... B60R 1/06; B60R 1/12
[52] U.S. Cl. .................................. 296/84 B; 98/2.12; 15/313
[58] Field of Search ...................... 296/84 B, 91, 95 Q, 296/95 R; 98/2.12, 2.19; 280/152 R, 153 R; 15/313

[56] References Cited

U.S. PATENT DOCUMENTS

| 4,033,245 | 7/1977 | De Rees | 296/84 B |
| 4,039,221 | 8/1977 | Eady | 296/84 B |

FOREIGN PATENT DOCUMENTS 2265581  3/1974  France ..................... 296/84 B

Primary Examiner—Richard A. Bertsch

[57] ABSTRACT

A vehicle mirror cleaning device for use with a motor vehicle having an outside rear view mirror. The device comprises an air deflection screen mounted on the vehicle and disposed between the associated outside rear view mirror and the driver. The air deflection screen is formed of a transparent material permitting the driver to observe the operative face of the associated mirror through the screen. The screen includes a substantial larger planar air engaging portion disposed at an angle to the longitudinal axis of the associated vehicle and an air deflecting portion for directing the air impinging upon the air engaging portion onto the operative face of the associated mirror thereby to direct a stream of air across the face of the mirror and provide a cleaning effect thereon.

2 Claims, 6 Drawing Figures

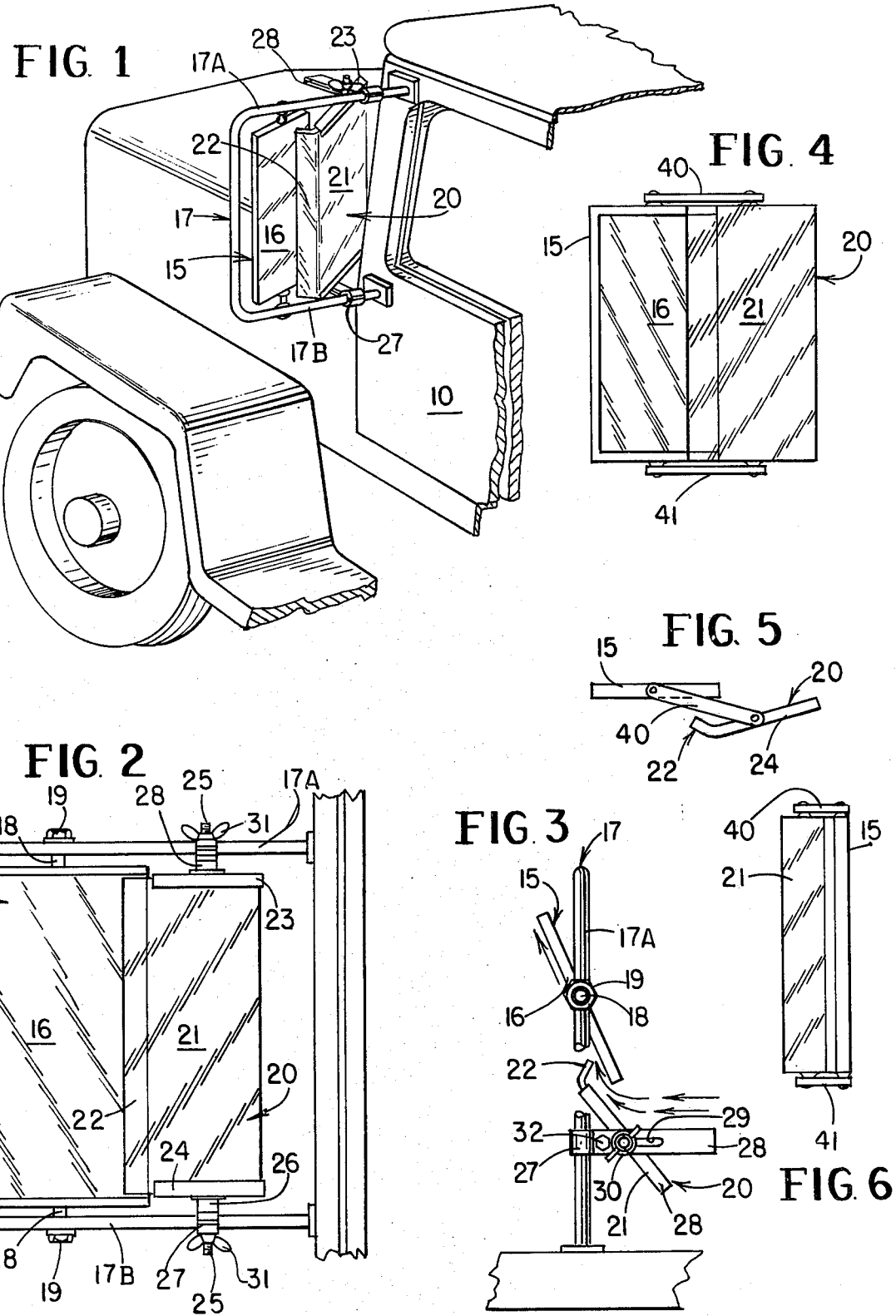

VEHICLE MIRROR CLEANING DEVICE

BACKGROUND OF THE INVENTION

The invention is directed generally to a vehicle mirror cleaning device for use with a motor vehicle having an outside rear view mirror thereon. In particular, the device is useful on trucks, buses and other vehicles in which the mirror may be separated from the vehicle body thereby having an air gap between the vehicle body and the mirror.

In larger motor vehicles, such as trucks and buses, wherein the mirror is spaced from the vehicle body, the air flow around the mirror permits dust and dirt and other accumulation of grime thereon. As a result, the driver of the vehicle, because of constant use and exposure to such conditions, is required to more frequently clean the outside rear view mirror than might be the case for the driver of an automobile. Moreover, because drivers of larger motor vehicles are much more dependent upon their outside rear view mirrors, the importance of the outside rear view mirror and its cleanliness should be apparent.

SUMMARY OF THE INVENTION

Accordingly, the present invention is directed to a vehicle mirror cleaning device which automatically directs a stream of air across the operative face of the mirror proportional to the speed of the vehicle, thereby to provide a cleaning effect on the mirror.

More particularly, an important feature of the present invention is the provision of a low-cost air deflecting screen formed as a unitary member and which may easily be mounted upon the vehicle hardware generally used for mounting the outside rear view mirror.

It is a further object of the invention to provide means for mounting the air deflector screen so as to provide pivotal movement of the screen relative to the associated mirror thereby permitting the driver to vary the angle of the air deflecting screen so as to change the pattern of the flow of air across the operative face of the mirror.

Yet another object of the invention is to provide, in conjunction with the mounting means of the air deflection screen, means permitting relative movement of the air deflecting screen to the associated mirror, whereby the position of the air deflecting screen relative to the mirror, as well as the angular relationship of the screen to the mirror, may be easily changed to accommodate the position of different drivers of the vehicle, as well as changes in position of the mirror as may be effected by the driver of the vehicle.

The features of the present invention which are believed to be novel are set forth in particularity in the appended claims. The invention, together with further objects and advantages thereof, may best be understood by reference to the following description, taken in connection with the accompanying drawings:

BRIEF DESCRIPTION OF THE DRAWINGS

FIG. 1 is a perspective view of a portion of a vehicle, such as a truck, on which there is mounted an outside rear view mirror and a mirror cleaning device constructed in accordance with and embodying the features of the present invention;

FIG. 2 is an enlarged elevational view of the mirror and mirror cleaning device illustrated in FIG. 1, looking at such device from the rear of the vehicle forwardly;

FIG. 3 is a plan view of the air cleaning device and associated mirror illustrated in FIGS. 1 and 2 and embodying the features of the present invention;

FIG. 4 is a second embodiment of the invention in which the mirror cleaning device is mounted directly upon the associated mirror;

FIG. 5 is a side view of the second mounting embodiment illustrated in FIG. 4; and FIG. 6 is a plan view of the second embodiment of mounting means of the present invention.

DESCRIPTION OF THE PREFERRED EMBODIMENT

Illustrated in the drawings is a vehicle mirror cleaning device for use with a motor vehicle having an outside rear view mirror used by the drivers of such vehicle. A portion of a typical truck cab is representative of a motor vehicle of the type in which a mirror cleaning device of the present invention is particularly useful, the cab being designated generally by the numeral 10. Mounted on the vehicle 10 in the customary manner is an outside rear view mirror 15 having an operative reflective front face 16 by which the driver of the vehicle 10 is able to observe conditions to the side and rear of the vehicle in a customary and well-known manner.

The mirror 15 is mounted upon the vehicle body 10 by means of a generally U-shaped mounting bracket designated as 17, having upper and lower mounting members 17A and 17B fixedly secured to the vehicle 10. A pair of mounting rods 18 may be fixedly secured to the mirror 15 in a customary manner and appropriate nuts 19 are utilized to secure the opposite ends of the mounting rods 18 to the respective upper and lower mounting members 17A and 17B, whereby the angular position of the mirror relative to the mounting member 17 may be easily accomplished.

In accordance with the present invention, an air deflection screen designated generally by the numeral 20 is mounted on the vehicle 10 and is disposed between the associated outside mirror 15 and the driver position within the vehicle 10.

The air deflection screen 20 is formed of a transparent material permitting the driver to observe the operative face 16 of the associated mirror and preferably the screen 20 is formed of a synthetic organic resin, although it also may be formed of glass.

The screen 20 includes a substantially larger planar air engaging portion 21 which, as illustrated in FIGS. 1 and 3, generally is disposed at an angle to the longitudinal axis of the associated vehicle and may be substantially parallel to the associated front operative face 16 of the mirror 15. The screen 20 further includes an air deflecting portion 22 which, in the preferred embodiment, is integrally formed with the air engaging portion 21. The air deflecting portion receives the air impinging upon the air engaging portion and directs a stream of air onto the operative face 16 of the mirror 15 thereby to provide a flow of air proportional to the speed of the vehicle for the purpose of cleaning off the dust, grime, water accumulation or the like on the face of the mirror (FIG. 3).

As best seen in FIG. 2, the air engaging portion 21 of the screen 20 (and also preferably the air deflecting portion 22) are substantially coextensive in length to the major vertical dimension of the operative face 16 of the associated mirror thereby to assure a flow of air across the entire operative face of the mirror.

As best illustrated in FIG. 3, the air deflecting portion 22 preferably is disposed at an angle of about 135° relative to the air engaging portion 21 of the deflecting screen 20. This permits a deflection of the air stream so it will travel substantially directly across the operative face 16 of the mirror 15, as illustrated by the arrows of FIG. 3, and thereby provide a cleaning effect thereon.

The air deflecting screen 20 includes means for mounting same for pivotal movement relative to the associated mirror 15, whereby the angle of the screen 20 relative to the mirror 15 may be altered so as to vary the pattern of the flow of air across the operative face 16 of the mirror 15, if desired. In addition, it is also desirable to be able to permit the screen 20 to be moved in a relative direction to the associated mirror 15, thereby to accommodate changes in the mirror position, while, if desirable, maintaining the same angular relationship between the screen and the operative front face 16 of the mirror.

With reference to FIGS. 1-3, it will be observed that the air deflecting screen 20 is mounted upon the parallel horizontally disposed mounting members 17A and 17B of the mirror mounting bracket 17. As best seen in FIG. 2, the screen 20 carries U-shaped channels 23 and 24 on the upper and lower ends of the air engaging portion 21. Each channel 23 and 24 has fixedly secured thereto an elongated male threaded member 25 extending outwardly therefrom. A pair of anchor nuts 26 is secured on the lower end of each threaded member 25 and thereafter a C clamp 27 is mounted upon each of the threaded members 25. Each clamp 27 includes C portions which override the respective upper or lower arms 17A-17B of the bracket 17, and each clamp includes a laterally extending arm 28. Each arm 28 has an elongated slot 29 therein, the slot serving to receive the respective male threaded members 25 carried by the channels 23 and 24.

To secure the screen 20 to the C clamps 27, an appropriate serrated locking washer may be disposed between the arm 28 and around the member 25 and thereafter a wing nut such as 31 may be carried by each threaded member. It will of course be appreciated that loosening of the respective wing nuts 31 permits the screen 20 to be moved laterally within the slots 29 of each respective C clamp 27, whereby the screen 20 may be moved relative to the mirror 15. In addition, the members 25 are rotatable in the slots 29 thereby to permit rotation of the screen 20 relative to the mirror 15.

An appropriate threaded member such as 32 is used to securely fix each clamp 27 onto the respective mounting members 17A or 17B.

It will thus be observed that the screen 20 is mounted for both pivotal and relative movement to the mirror 15, whereby the screen may easily be shifted in its position to accommodate both changes in the mirror position 15 as well as changes which may be desired by the driver of the vehicle as he might change his position, or to accommodate different sized drivers who may cause the vehicle seat to be shifted.

As the vehicle is driven the wind screen will maintain a passage of an air stream across the operative face 16 of the mirror 15, the air stream being proportional to both the speed of the truck and the head wind encountered by the truck. The screen 20 may be easily and quickly mounted to a rear view mirror using conventional mounting members found on existing trucks and other large vehicles.

As illustrated in FIGS. 4, 5 and 6, an alternate embodiment of the mounting means is provided to effect both the pivotal and relative movement of the screen 20 to the mirror 15. In this embodiment, the mirror 15 includes the operative front face 16, and the screen 20 includes the larger air engaging portion 21 and the air deflecting portion 22. The screen 20 is mounted on the mirror 15 by means of a pair of identically shaped upper and lower parallel mounting arms 40 and 41, each end of which is pivotally connected to both the respective upper and lower portions of both the mirror and the screen. It will thus be appreciated that the screen 20 is movable in a pivotal position without moving the arms 40 and 41 relative to the mirror 15, and, in addition, the screen is movable relative to the mirror 15 by pivoting the arms 40 and 41 relative thereto, while preserving the angular position if desired. This embodiment may be more easily installed at a factory as part of the original equipment for vehicle, as opposed to a kit which could be used for installation on existing equipment.

It should be apparent from the foregoing that a novel vehicle mirror cleaning device has been provided which is relatively inexpensive to produce and which is capable of being used with both existing vehicles and new vehicle construction, and which effects a substantial cleaning operation on the mirror, thereby assuring safer conditions for operation of the vehicle.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A vehicle mirror cleaning device for use with a motor vehicle having an outside rear view mirror used by the driver of such vehicle, said device comprising an air deflection screen mounted on said vehicle and disposed between the associated outside mirror and the driver, said air deflection screen being formed of a transparent material permitting the driver to observe the operative face of the associated mirror, said screen including a substantially larger planar air engaging portion disposed at an angle to the longitudinal axis of the associated vehicle and including an air deflecting portion for directing a stream of air impinging upon said air engaging portion onto the operative face of the associated mirror thereby to direct a stream of air across the face of the mirror and provide a cleaning effect thereon, and means for mounting said air deflecting screen for pivotal movement relative to the associated mirror, said means comprising a pair of clamps carried by the upper and lower edges of said screen, each of said clamps having C-ends formed thereon for securing said clamp to mounting members carried by the associated vehicle, each of said clamps including a laterally extending arm having a slot therethrough, said screen having male members extending outwardly from the upper and lower edges thereof and through the respective slots in said arms, and means for releasably securing said arms to said male members whereby said air deflection screen is rotatably mounted relative to said clamps and also is movable within said slots for movement relative to said clamps, thereby to vary the angle and position of the air deflecting screen relative to the associated mirror so as to vary the pattern of the flow of air across the operative face of said mirror.

2. A vehicle mirror cleaning device for use with a motor vehicle having an outside rear view mirror used by the driver of such vehicle, said device comprising an air deflection screen mounted on said vehicle and disposed between the associated outside mirror and the driver, said air deflection screen being formed of a transparent material permitting the driver to observe the operative face of the associated mirror, said screen including a substantially larger planar air engaging portion disposed at an angle to the longitudinal axis of the associated vehicle and including an air deflecting portion for directing a stream of air impinging upon said air engaging portion onto the operative face of the associated mirror thereby to direct a stream of air across the face of the mirror and provide a cleaning effect thereon, said air deflecting screen being mounted on the associated mirror by a pair of arms pivotally connected to both said screen and the associated mirror whereby said screen is mounted for both pivotal and relative movement with relation to the operative face of the associated mirror, thereby to vary the angle of the air deflecting screen relative to the associated mirror so as to vary the pattern of the flow of air across the operative face of said mirror.

* * * * *